T. T. MARKLAND, Jr.
Water Cooler.
No. 53,998. Patented April 17, 1866.
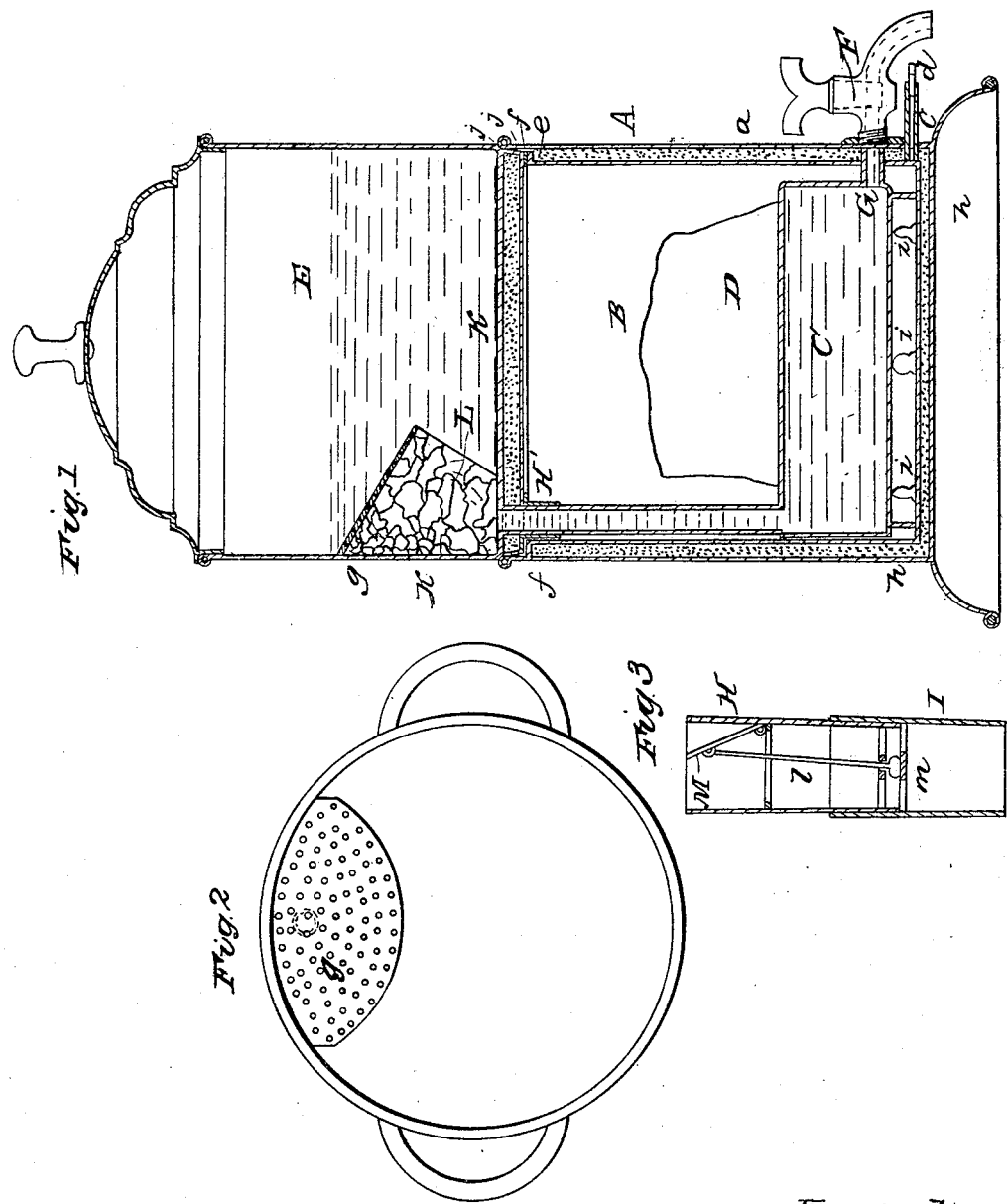
Witnesses
Stephen Ustick
David Eldridge.
Inventor
Thomas T. Markland Jr.

UNITED STATES PATENT OFFICE.

THOMAS T. MARKLAND, JR., OF PHILADELPHIA, PENNSYLVANIA.

IMPROVED WATER-COOLER.

Specification forming part of Letters Patent No. 53,998, dated April 17, 1866.

*To all whom it may concern:*

Be it known that I, THOMAS T. MARKLAND, Jr., of the city and county of Philadelphia, and State of Pennsylvania, have invented a new and useful Improvement in Water-Coolers; and I do hereby declare that the following is a full, clear, and exact description of the construction and operation of the same, reference being had to the annexed drawings, making a part of this specification, in which—

Figure 1 is a vertical section of the cooler. Fig. 2 is a top view of the reservoir E with the top removed for the purpose of showing the construction of the interior. Fig. 3 is a vertical section of the tube H' and fitting I detached from the cooler, on enlarged scale.

Like letters in all the figures indicate the same parts.

The nature of my invention mainly consists in constructing the cooler with a cistern separate from the ice-chamber in such a manner that the ice shall not come into contact with the water in the cistern, and thus avoiding the unwholesomeness of the water when the ice is melted in it.

To enable others skilled in the art to which my improvement appertains to make and use my invention, I will proceed to describe its construction and operation.

A is the lower portion of the body of the cooler. It is made double, so as to have an annular space, $a$, and a bottom space, $b$, which are filled in with charcoal or other non-conductor. In the chamber B there is a cistern, C, for holding the water to be cooled, on the top of which is placed a lump of ice, D, for cooling the water in the cistern. Connected with the top of the body A is a reservoir, E, for holding a supply of water to be fed into the cistern C by means of its own weight as the water is drawn from the latter by means of the faucet F, which communicates with the short pipe G leading from the cistern. There is a vertical tube, H, connected at its lower end with the cistern C and at its upper end with the reservoir E, there being a short tube, H', projecting down from the bottom of the reservoir, which is connected with the said tube H by means of the fitting I. There is a short pipe, $c$, leading from the chamber B, for discharging the water which is formed by the melting of the ice, which has a plug, $d$, for closing it. A faucet may be used instead of the plug.

The reservoir fits in the top of the body A, as represented in Fig. 1; but there may be an annular flange on the reservoir instead of on the body A, which shall be deep enough to protect the tube H when the reservoir is lifted off and set on a flat surface for supplying the chamber B with ice.

In the rabbet $e$ there is a gum ring, $f$, for making the joint air-tight to prevent the undue melting of the ice. J is the cover of the reservoir.

There is a chamber, K, in the reservoir E, which receives a piece of sponge, L, through which the water filters as it passes into the supply-tube H. The chamber is formed by uniting the bent piece of perforated tin $g$ to the side of the reservoir. The object of the perforations is to facilitate the flowing of the water in the reservoir through the sponge.

The bottom of the cistern E has a rim, $h$, to raise it above the bottom of the cooler to prevent the water in the chamber B being confined by getting between the two bottoms, there being serrations $i$ to allow the water passing off freely when the plug $d$ is withdrawn.

The reservoir is made with a double bottom, $jj$, by which a space, $k$, is formed to contain filling to prevent the heat of the water in the reservoir affecting the ice in the chamber B.

In the tube H' there is a valve, M, for cutting off the communication between the reservoir E and the tube H, when the former is lifted from the chamber B for supplying the latter with ice, the weight of the water above closing the valve at that time as it presses upon its upper surface; and when the reservoir is put in its place the stem $l$ of the valve bears with its lower end on the bridge $m$ of the fitting I, and thus raises the valve to open the communication between the reservoir and the cistern C.

Instead of the tube H passing down through the interior of the ice-chamber B, it may be placed outside of the same, if desired, and communicates with the reservoir and the cistern by means of elbow-fittings.

The operation is as follows: The reservoir E is supplied with a sufficient quantity of water to keep the cistern C always full, and as the water in the cistern is drawn out by means of the faucet F the same quantity descends from the reservoir to supply its place.

Having thus fully described my improvement in water-coolers, what I claim therein as new, and desire to secure by Letters Patent, is—

The combination of the reservoir E, valve-tube H, cistern C, and ice-chamber B, arranged and operating in relation to each other substantially in the manner described, and for the purpose specified.

In testimony that the above is my invention I have hereunto set my hand and affixed my seal this 16th day of February, 1866.

THOMAS T. MARKLAND, JR. [L. S.]

Witnesses:
 STEPHEN USTICK,
 DAVID ELDRIDGE.